US008671790B2

(12) United States Patent
Blanchard

(10) Patent No.: US 8,671,790 B2
(45) Date of Patent: Mar. 18, 2014

(54) TRANSMISSION MECHANISM HOUSING, NOTABLY FOR TRANSMISSION BETWEEN AN INPUT DRIVESHAFT AND AN OUTPUT SHAFT

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 198 days.

(21) Appl. No.: 13/274,661

(22) Filed: Oct. 17, 2011

(65) Prior Publication Data

US 2012/0096971 A1 Apr. 26, 2012

(30) Foreign Application Priority Data

Oct. 25, 2010 (FR) ...................................... 10 58728

(51) Int. Cl.
*F16H 57/02* (2012.01)
(52) U.S. Cl.
USPC .......................................... 74/335; 74/606 R
(58) Field of Classification Search
USPC ................................................ 74/335, 606 R
See application file for complete search history.

(56) References Cited

U.S. PATENT DOCUMENTS

| 3,054,302 A | * | 9/1962 | Cone ........................... 74/473.28 |
| 4,673,055 A | * | 6/1987 | Yamaoka et al. ............ 192/3.57 |
| 4,702,120 A | * | 10/1987 | Okada et al. ..................... 74/371 |
| 4,841,794 A | * | 6/1989 | Hikishima ....................... 74/371 |
| 4,907,466 A | * | 3/1990 | Kuhn ................................ 74/378 |
| 5,094,121 A | * | 3/1992 | von Kaler .................. 74/473.27 |
| 5,345,837 A | | 9/1994 | von Kaler et al. |
| 2002/0139222 A1 | | 10/2002 | Blanchard |

FOREIGN PATENT DOCUMENTS

| EP | 0 782 820 A1 | 7/1997 |
| FR | 2 822 916 A1 | 10/2002 |

OTHER PUBLICATIONS

French Search Report, dated May 19, 2011, from corresponding French application.

* cited by examiner

*Primary Examiner* — Ha D Ho
(74) *Attorney, Agent, or Firm* — Young & Thompson

(57) ABSTRACT

Transmission mechanism housing (1) of the type including two half-shells (1A, 1B) that can be assembled generally via a parting line, this housing (1) accommodating at least one control member (2) moved angularly with the aid of a lever (3) outside the housing (1), the lever (3) including a sleeve (4) that can be inserted removably into a receiving bearing (5) of the housing (1), the sleeve (4) being capable, in the state in which it is inserted into the receiving bearing (5), of being held in at least one predetermined axial position by locking elements (6A, 6B). The locking elements (6A, 6B) are configured in order to travel from the locked position to the unlocked position, and vice versa, by simple relative rotary movement of the sleeve (4) and of the bearing (5) about the longitudinal axis of the sleeve (4).

12 Claims, 4 Drawing Sheets

TRANSMISSION MECHANISM HOUSING, NOTABLY FOR TRANSMISSION BETWEEN AN INPUT DRIVESHAFT AND AN OUTPUT SHAFT

The present invention relates to a transmission mechanism housing, notably for transmission between an input drive shaft and an output shaft, such as the shaft for driving the wheels of a travelling machine, in particular of a self-propelled machine, such as a lawnmower, a golf cart or other machine.

Usually, such a housing comprises two half-shells that can be assembled via a parting line. This housing accommodates at least one member, such as a fork, for clutch control, or gear change, or brake, or direction reversal, this control member being moved angularly with the aid of a lever outside the housing. The said lever comprises a sleeve that can be inserted removably into a receiving bearing of the housing. The said sleeve is capable, in the state in which it is inserted into the said receiving bearing, of being held in at least one predetermined axial position by locking means.

Hitherto, the lever has been held in the inside of the housing by snap-fit connection. The drawback of such a solution lies in the fact that, in the snap-fitted state, the housing being closed, the lever can no longer be removed without reopening the housing.

In point of fact, it has happened that, for certain housings, it is necessary to carry out a rapid change of the seal between lever and housing because leaks have been found. Dismantling is then tricky since the housing must be reopened and the lever deformed in the direction of unlocking.

One object of the present invention is therefore to propose a housing, the design of which makes it possible to unlock the lever, that is to say to separate the lever from the housing without having to open the housing.

Accordingly, the subject of the invention is a transmission mechanism housing, said housing comprising two half-shells that can be assembled generally via a parting line, this housing accommodating at least one member such as a fork, for clutch control, or for gear change, or for brake, or for direction reversal, this control member being moved angularly with the aid of a lever outside the housing, the said lever comprising a sleeve that can be inserted removably into a receiving bearing of the housing, the said sleeve being capable, in the state in which it is inserted into the said receiving bearing, of being held in at least one predetermined axial position by locking means, characterized in that the said locking means are configured in order to travel from the locked position to the unlocked position, and vice versa, by simple relative rotary movement of the sleeve and of the bearing about the longitudinal axis of the sleeve.

Preferably, the locking means between sleeve and bearing, in the at least partially inserted state of the sleeve in the said bearing, are locking means of the bayonet type formed by at least one non-tractable lug and at least one notch supported respectively without distinction, one or the ones by the sleeve, the other or the others by the bearing, the said locking means being capable of moving from an unlocked position to a locked position in which the or at least one of the lugs of the sleeve, or respectively of the bearing, is engaged with the or at least one of the notches of the bearing, or respectively of the sleeve, by a simple relative rotary movement of the sleeve and of the bearing.

Preferably, the lugs are made on the sleeve and the notches in the bearing of the housing. However, the reverse solution, namely making the lugs in the bearing of the housing and the notches on the sleeve, is an equally envisageable solution.

Preferably, the housing comprises externally an abutment for limiting angular movement of the lever, the said lever extending, on one side of the said abutment, in the unlocked position of the locking means and, on the other side of the said abutment, in the locked position of the locking means, the said lever being an elastically deformable lever capable of passing from one position to another by angular movement by force in order to make it possible to pass over the hard spot formed by the said abutment.

The presence of this abutment prevents the unintentional unlocking of the lever from the housing.

Preferably, the control lever, of the cable-control type, is prefitted with a spring to which the control cable is capable of being connected.

The prior installation of a spring on the lever makes it possible to ensure that the spring has the technical characteristics required for the envisaged application.

Preferably, the lever is fitted with a return means for returning to a predetermined position called the rest position, the said return means being formed by a compression spring placed outside the housing, between housing and lever.

The use of a compression spring allows the said spring to apply a return force that is opposite and substantially parallel to that applied by the spring to which the control cable is capable of being connected so that the housing is acted upon slightly or not at all. Moreover, the use of a compression spring makes it possible to position it beneath the pulley so that it is protected by the said pulley.

In the case of a transmission housing of the type for a transmission between an input drive shaft and an output shaft, such as the shaft for driving the wheels of a travelling machine, the control member is a member for controlling a cone clutch mechanism housed with a reduction gear mechanism at least partially inside the housing, the said reduction gear mechanism comprising a driving member engaged with a driven member, the driven member of the reduction gear mechanism being formed by a gear wheel mounted so as to rotate freely on the output shaft and able to be coupled to/uncoupled from the said shaft by means of the two friction cones of the clutch mechanism, placed so as to be coaxial with the axial bore of the gear wheel and capable of coming, under the action of the said control member, into bearing contact with a conical bearing surface of the gear wheel, the conical bearing surfaces of the gear wheel being, relative to the axis of rotation of the wheel, offset axially from the gear teeth of the gear wheel and being placed on the same side of the said gear teeth.

The invention will be clearly understood on reading the following description of exemplary embodiments, with reference to the appended drawings in which.

Figure 1:
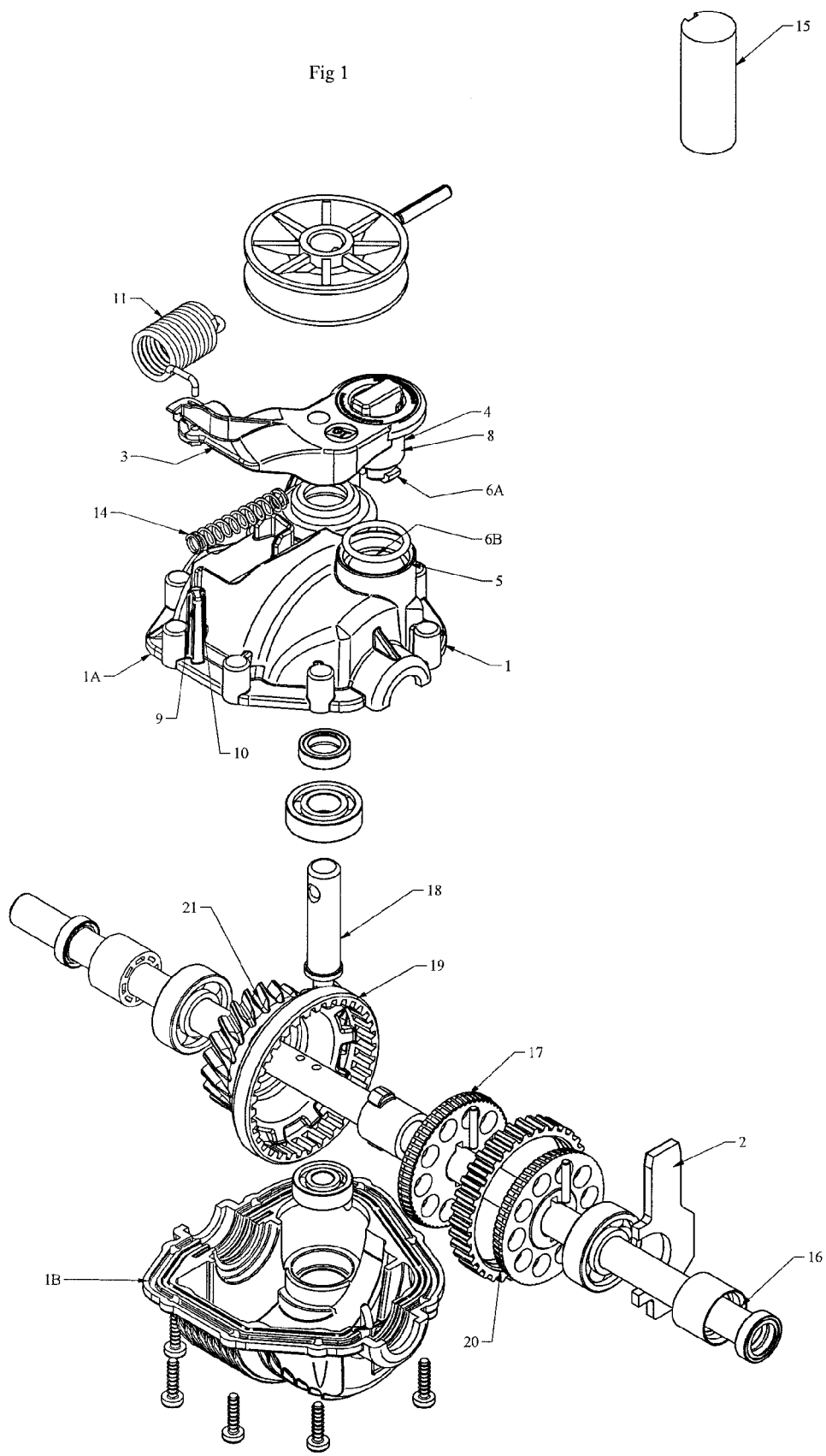
FIG. 1 represents a view in perspective in the exploded position of the elements forming a housing according to the invention.
Figure 2:
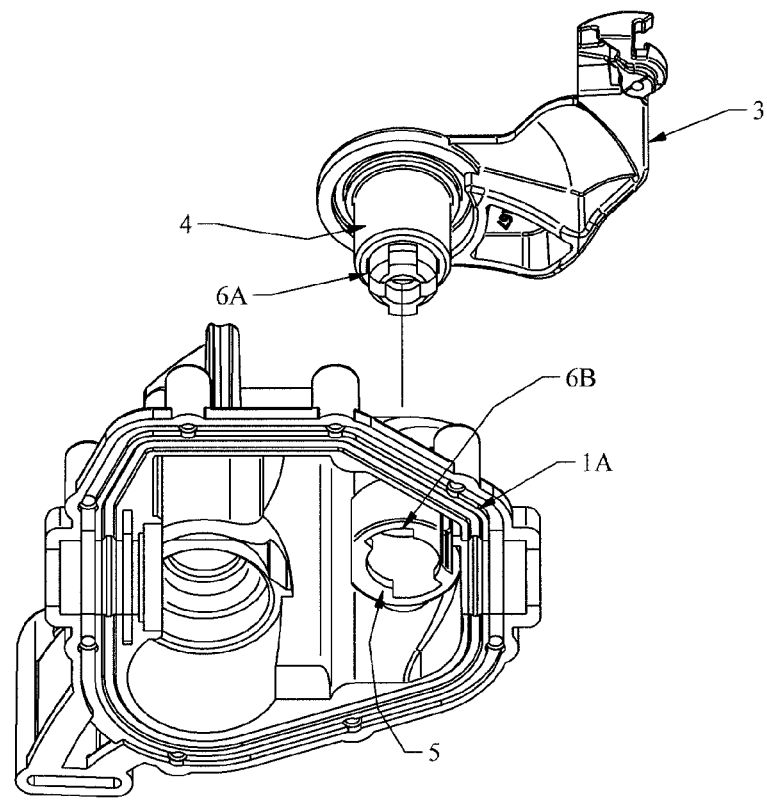
FIG. 2 represents a view in perspective from below of the top half-shell of the housing and of the lever being locked to the said half-shell in the unassembled state of the said elements.
Figure 3:
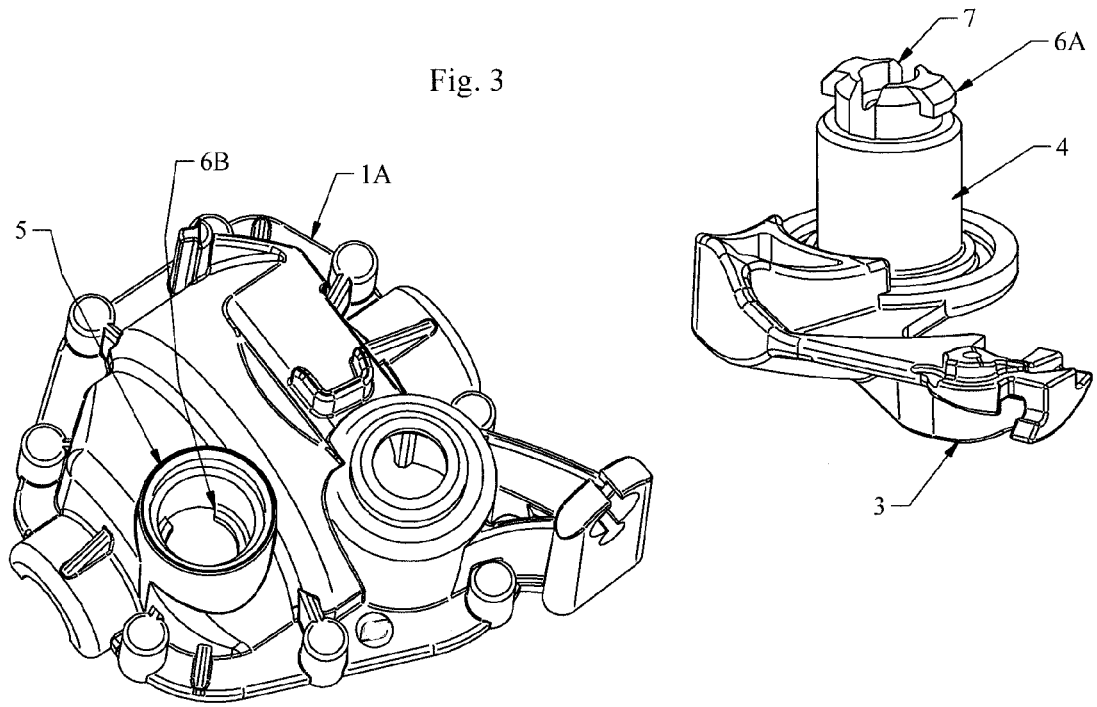
FIG. 3 represents a view in perspective from above of the top half-shell of the housing and of the lever being locked to the said half-shell in the unassembled state of the said elements.
Figure 4:
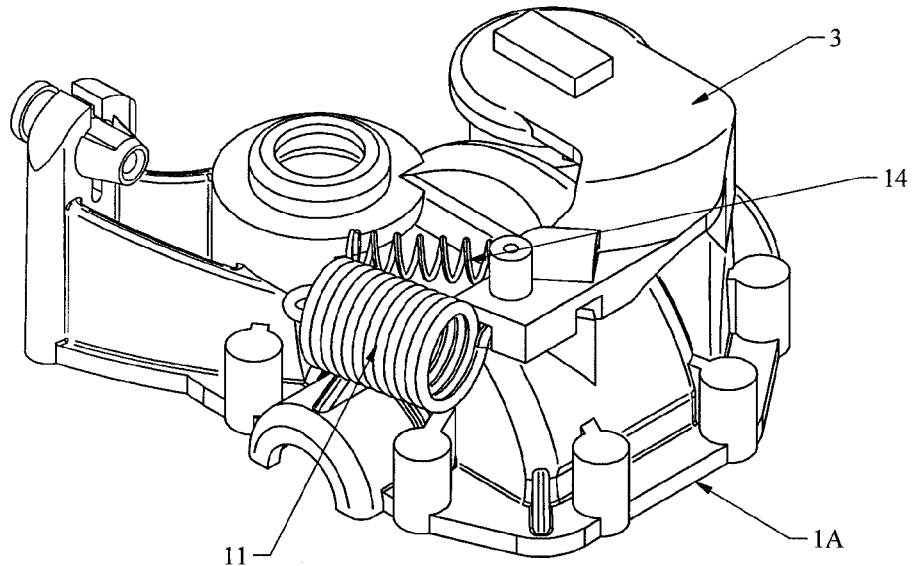
FIG. 4 represents a view in perspective from above of the top half-shell of the housing in the state in which the lever and the springs are installed.

As mentioned above, the transmission mechanism housing 1, the subject of the invention, comprises two half-shells 1A, 1B that can be assembled via a parting line.

This housing 1 accommodates at least one member 2 such as a fork, for clutch control, or gear change, or for brake or for direction reversal.

In the examples shown, the control member 2 is a control member of a cone clutch mechanism 17 accommodated with a reduction gear mechanism at least partially inside the housing 1, the said reduction gear mechanism comprising a driving member 18, such as a worm, in engagement with a driven member 19 formed of a gear wheel 19 mounted so as to rotate freely on the output shaft 16 and able to be coupled to/uncoupled from the said shaft 16 by means of the two friction cones 17 of the clutch mechanism, the said cones being coaxial with the axial bore of the gear wheel 19 and capable of coming, under the action of the said control member 2, into bearing contact with a conical bearing surface 20 of the gear wheel 19, the conical bearing surfaces 20 of the gear wheel 19 being, relative to the axis of rotation of the wheel, offset axially from the gear teeth 21 of the gear wheel 19 and being placed on one and the same side of the said gear teeth 21.

This clutch control member or other control member 2 is moved angularly with the aid of a lever 3 outside the housing 1 for the transition from the disengaged position to the engaged position, in the case of a clutch control, or from the brake-off position to the brake-on position, in the case of a brake control, or from the forward travel position of the vehicle to the reverse travel position of the vehicle, in the case of a direction reversal lever, or from one gear to another in the case of a gearbox control lever.

This lever 3 comprises a sleeve 4 that can be inserted removably into a receiving bearing 5 of the housing 1. The sleeve 4 is capable, in the state in which it is inserted into the receiving bearing 5, of being held in at least one predetermined axial position by locking means 6A, 6B.

Usually, the sleeve 4 of the lever 3 is inserted into a receiving bearing 5 formed by a circular cavity made in the half-shell called the top half-shell, of the housing, that is to say the half-shell 1A designed to be coupled to the said lever 3.

The means 6A, 6B for locking between sleeve 4 and bearing 5, in the state in which the sleeve 4 is at least partially inserted in the said bearing 5, are locking means of the bayonet type formed by at least one, preferably at least two, non-retractable lug(s) 6A, and at least one, preferably at least two, notch(es) 6B, lug(s) and notch(es) being supported respectively without distinction, the one or the ones by the sleeve 4, the other or the others by the bearing 5, the said locking means 6A, 6B being capable of moving from an unlocked position to a locked position in which the or at least one of the lugs 6A of the sleeve, or respectively of the bearing, is engaged with the or at least one of the notches 6B of the bearing, or respectively of the sleeve, by simple relative rotary movement of the sleeve 4 and of the bearing 5.

In the examples shown, the sleeve 4 is a sleeve that is slotted over a portion of its length and makes, between the said slots 7, fingers 8, a portion of the body of the control member 2 being accommodated, in the assembled state of the housing 1, in the slots 7 made between the said fingers 8 for an installation that is attached in angular movement to the lever 3 and to the control member 2, the or at least two of the fingers 8 being furnished at their free end with an external radial protrusion constituting the lug 6A for locking the sleeve 4 to the bearing 5. The lugs are therefore made in a diametrically opposed manner.

The bearing 5 is furnished internally with a discontinuous annular collar, the annular sectors of the said collar forming, by their face turned towards the bottom of the housing, the notches 6B of the means for locking the bearing 5 against which the lugs 6A of the sleeve 4 press after passing through the space left free between two annular sectors and relative rotary movement of the sleeve 4 and of the bearing 5.

In the examples shown, the bearing comprises two notches and the sleeve two lugs preferably placed, on each occasion, in a diametrically opposed manner. Naturally, a reverse solution could equally have been envisaged, the lugs being placed on the bearing and the notches on the sleeve. The lugs could have been made in the form of nipples protruding inside the bearing, the notches being made by cut-outs from the sleeve.

The locking/unlocking takes place, in both cases, in an identical manner in the at least partially inserted state of the sleeve in the bearing, namely by relative angular movement of the sleeve 4 and of the bearing 5 about the longitudinal axis of the sleeve 4 or of the bearing 5.

Usually, the slotted sleeve comprises, in its zone of connection to the base of the fingers, at least one shoulder butting against a shoulder of the receiving bearing of the housing, in the inserted position of the sleeve in the housing. A seal is interposed between the said shoulders.

In the examples shown, the slotted sleeve has two diametrically opposed axial slots into which one end of the body of the control member consisting of a web of square or rectangular section is inserted, so that in the locked position the web of the control member extends in a diametral plane of the sleeve.

The end of the body of the control member, opposed to that accommodated in the receiving bearing of the housing receiving the slotted sleeve, is accommodated inside a bearing of the housing consisting of a cavity having a section of the general form, for example, of a butterfly, of which two opposite walls are delimited by convex surfaces connected together by two dihedrons placed so as to form the wings of a butterfly, the ridges of the dihedrons forming the pivot axis of the said control member.

The cavity with a section of generally butterfly form is manufactured in one piece with a wall of the half-shell called the bottom half-shell of the housing, that is to say the one with no lever and shown in 1B.

The control member is, as shown here, formed of a fork with two branches. The web of the fork, connecting the said branches together, is extended axially on either side of the said branches in order to form sections of rods of square or rectangular cross section being inserted into the bearings made in each half-shell of the housing.

In order to limit an unintentional unlocking of the lever 3, the housing 1 comprises externally an abutment 9 for limiting the angular movement of the lever 3. The said lever 3 extends, on one side of the said abutment 9, in the unlocked position of the locking means 6A, 6B and, on the other side of the said abutment 9, in the locked position of the locking means 6A, 6B, the said lever 3 being an elastically deformable lever 3 capable of passing from one position to another by angular movement by force in order to make it possible to pass over the hard spot formed by the said abutment 9.

Usually, the abutment 9 and the lever 3 are furnished respectively, over at least a portion of their zones designed to come into bearing contact when the locking means 6A, 6B pass from one position to another, with sliding ramps 10 capable of making it easier for the lever 3 to pass beyond the abutment 9.

Figure 7:
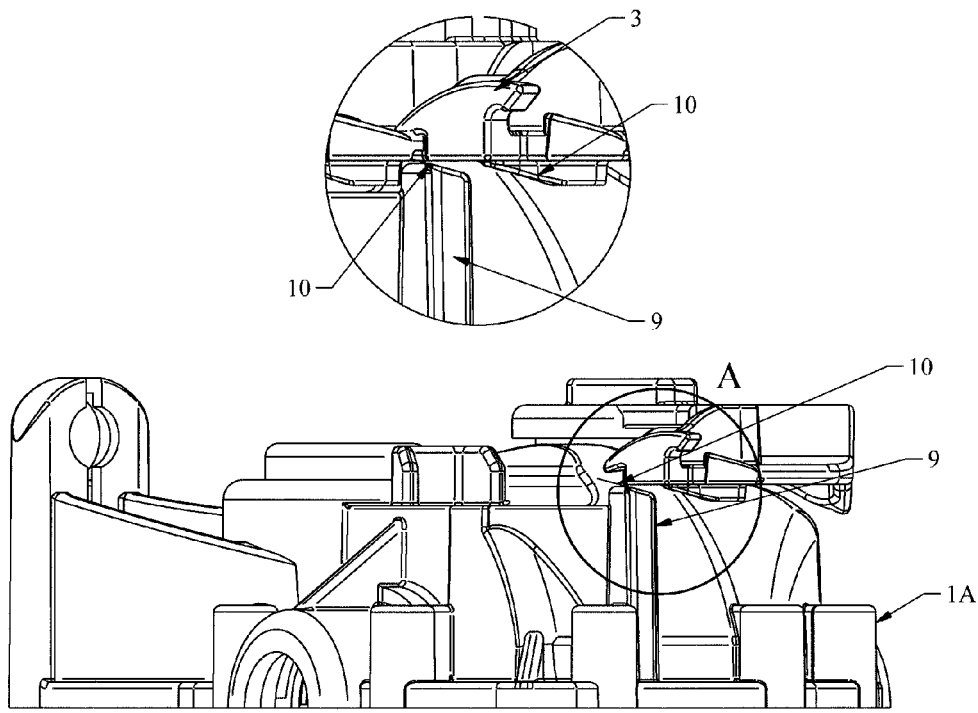
FIG. 7 represents a view of the top half-shell of the housing associated with a detailed view of the housing in the zone of the housing fitted with an abutment for limiting the angular movement of the lever, the lever being positioned on the side of the abutment corresponding to the position called the inactive position of the said abutment.
Figure 8:
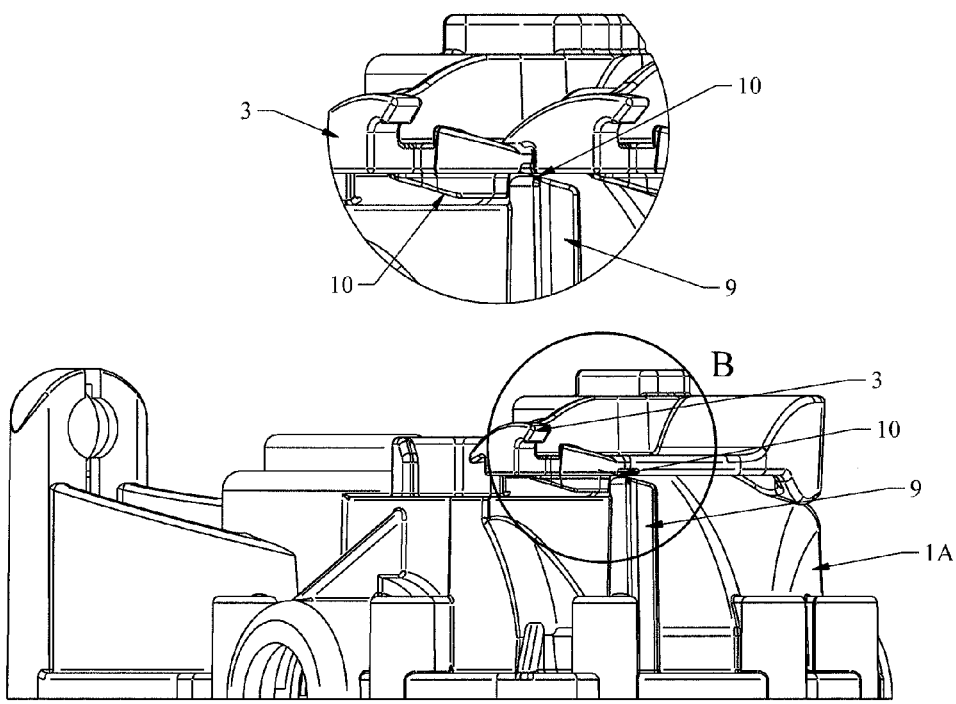
FIG. 8 represents a view of the top half-shell of the housing associated with a detailed view of the housing in the zone of the housing fitted with an abutment for limiting the angular movement of the lever, the lever being positioned on the side of the abutment corresponding to the position called the active position of the said abutment.

This design is more particularly visible in FIGS. 7 and 8, FIG. 7 showing the lever before passing the abutment 10, that is to say when the sleeve of the lever and the bearing of the housing are unlocked, FIG. 8 showing the lever after passing the abutment, the said lever then resting on the said abutment. Passing the abutment corresponds to the locking of the sleeve of the lever to the bearing of the housing. The lever is therefore elastically deformable in order to make it easier to pass beyond the said abutment.

Usually, the lever 3, of the cable control type is therefore connected via a spring 11 to a cable of which the opposite free end is coupled to a control handle or lever close to the steering wheel or handlebar of the machine.

In the examples shown, the control lever 3 is pre-fitted with the spring 11 to which the control cable is capable of being connected. This limits the problems associated with the spring.

For coupling it to the lever, the spring 11 is inserted, via its free end, to the inside of a pierced hole 12 of the lever 3, and is held inside the said pierced hole 12 by retaining means 13 made in a single piece with the said housing 1. These retaining means are active in the position in which the lever 3 is locked to the housing 1.

Figure 5:
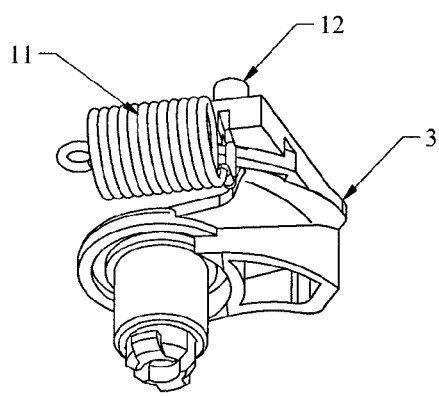
FIG. 5 represents a schematic view in perspective of the lever and of the spring for connection to the control cable during a step of attaching the spring to the lever.
Figure 6:
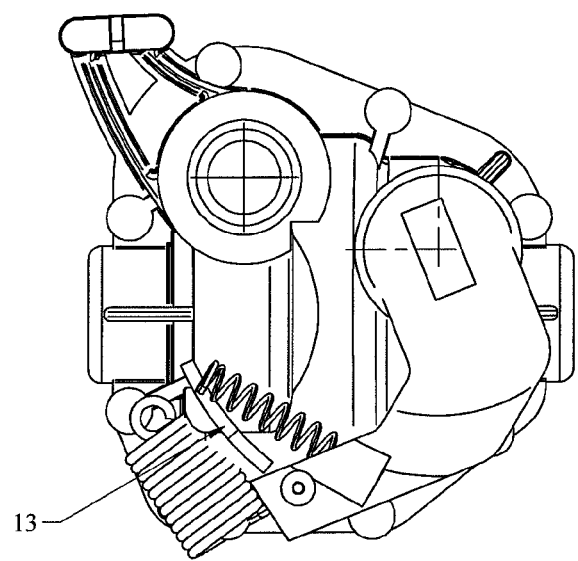
FIG. 6 represents a view from above of the lever, of the housing and of the spring for connection to the control cable, during another step of attachment of the spring to the lever before the locking of the said lever.

The detail of this installation is more particularly visible in FIGS. 5 and 6. The end of the spring 11 that is to be connected to the lever 3 is a bent end forming two branches. One of the branches of the spring 11, terminating in a free end, is inserted into a pierced hole 12 of the lever 3 and the other branch of the spring 11, which is connected to the spiral winding of the spring, is placed in a groove fitted to the said lever 3. In this position, the spring 11 can be separated from the lever 3. In order to prevent such a separation, the lever 3 is brought to the locked position so that the retaining means 13, such as a rib, of the housing close off the groove made in the lever 3.

The spring 11 is removed by unlocking the lever 3 to release the spring 11 from the groove and take the spring out of the pierced hole 12.

Thus, the installation/removal of the spring 11 is carried out extremely easily simply by locking/unlocking the lever 3.

In the examples shown, the lever 3 is fitted with a return means for returning to a predetermined position called the rest position, said return means being formed by a compression spring 14 placed on the outside of the housing 1 between housing 1 and lever 3.

As mentioned above, the lever 3 is locked to the housing 1 as follows:

First, the sleeve 4 of the lever 3 is inserted into the receiving bearing 5 of the housing 1 so that the lugs of the lever 3 pass through the openings made in the bearing, these openings separating the notches of the said bearing. This axial insertion causes a compression of the seal placed between the shoulders facing the sleeve and the bearing.

When the lugs have passed through the openings between the notches, the lever and the housing are moved angularly so that the lugs engage with the notches and ensure the axial immobilization of the sleeve of the lever inside the bearing of the housing in the direction of extracting the sleeve from the said bearing.

During this angular movement, the lever, by elastic deformation, passes beyond the abutment 9 for limiting the angular movement of the lever 3, which abutment is made on one of the outer faces of the said housing.

For unlocking, it is sufficient to proceed in the reverse manner.

As a consequence of the foregoing, the operations for locking or unlocking the lever with respect to the housing can without distinction be carried out in the open or closed position of the said housing.

The invention claimed is:

1. A transmission mechanism housing comprising:
   two housing shells that can be assembled generally along a parting line;
   at least one control member that is angularly movable via a lever positioned outside the housing;
   a receiving bearing; and
   a locking mechanism;
   wherein the lever comprises a sleeve configured to be removably inserted into the receiving bearing, and wherein when the sleeve is inserted into said receiving bearing, the sleeve is configured to be held in at least one predetermined axial position by said locking mechanism, and
   wherein said locking mechanism is movable between a locked position and an unlocked position, by relative rotary movement of the sleeve and the receiving bearing about a longitudinal axis of the sleeve.

2. The transmission mechanism housing according to claim 1, wherein the locking mechanism comprises a bayonet locking mechanism, formed by at least one lug and at least one notch,
   wherein one of the at least one lug and the at least one notch is formed in the sleeve, and the other of the at least one lug and the at least one notch is formed in the bearing, and
   wherein the at least one lug is configured to engage with the at least one notch by relative rotary movement of the sleeve and of bearing, thereby achieving the locked position of the locking mechanism.

3. The transmission mechanism housing according to claim 2, wherein:
   a portion of a length of the sleeve is slotted, and the slots define fingers therebetween, and
   in an assembled state of the housing, a portion of a body of the control member is accommodated in the slots, for an installation that is attached in angular movement to the lever and to the control member, and
   at least two of the fingers comprise at their free end an external radial protrusion constituting the lug for locking the sleeve to the bearing.

4. The transmission mechanism housing according to claim 2, wherein the bearing is furnished internally with a discontinuous annular collar, annular sectors of said collar forming, by their face turned towards a bottom of the housing, the notches of the locking mechanism, against which the lugs of the sleeve press, after passing through a free space between the two annular sectors during relative rotary movement of the sleeve and of the bearing.

5. The transmission mechanism housing according to claim 1, further comprising an external abutment configured to limit angular movement of the lever, said lever extending, on one side of said abutment in the unlocked position of the locking mechanism and, on the other side of said abutment, in the locked position of the locking mechanism, wherein said lever is elastically-deformable and configured to pass from one position to another by angular movement by force to pass over a hard spot formed by said abutment.

6. The transmission mechanism housing according to claim 5, wherein the abutment and the lever are configured to come into bearing contact with one another when the locking mechanism pass from one position to another, and wherein the housing further comprises sliding ramps configured to allow the lever to pass beyond the abutment as the locking mechanism pass from one position to another.

7. The transmission mechanism housing according to claim 1, wherein the control lever is a cable-control lever and is pre-fitted with a spring to which a control cable is configured to be connected.

8. The transmission mechanism housing according to claim 7, wherein the spring is inserted, via a free end thereof, inside a pierced hole of the lever, and wherein the spring is held inside the pierced hole by a retaining mechanism made in a single piece with said housing.

9. The transmission mechanism housing according to claim 1, wherein the lever is fitted with a compression spring placed outside the housing, between housing and lever, configured to return the lever to a rest position.

10. The transmission mechanism housing according to claim 1, wherein the housing is configured for a transmission between an input drive shaft and an output shaft, the housing further comprising a cone clutch mechanism and a reduction gear mechanism at least partially inside the housing, wherein the control member is configured to control the cone clutch mechanism, said reduction gear mechanism comprising a driving member engaged with a driven member, the driven member of the reduction gear mechanism being formed by a gear wheel mounted so as to rotate freely on the output shaft and able to be coupled to/uncoupled from said shaft by the two friction cones of the clutch mechanism, placed so as to be coaxial with the axial bore of the gear wheel and capable of coming, under the action of said control member, into bearing contact with a conical bearing surface of the gear wheel, the conical bearing surfaces of the gear wheel being, relative to the axis of rotation of the wheel, offset axially from the gear teeth of the gear wheel and being placed on the same side of said gear teeth.

11. The transmission mechanism housing according to claim 3, wherein the bearing is furnished internally with a discontinuous annular collar, annular sectors of said collar forming, by their face turned towards a bottom of the housing, the notches of the locking mechanism, against which the lugs of the sleeve press after passing through the space left free between two annular sectors during relative rotary movement of the sleeve and of the bearing.

12. The transmission mechanism housing according to claim 11, further comprising an external abutment configured to limit angular movement of the lever, said lever extending, on one side of said abutment in the unlocked position of the locking mechanism and, on the other side of said abutment, in the locked position of the locking mechanism, wherein said lever is elastically-deformable and configured to pass from one position to another by angular movement by force to pass over a hard spot formed by said abutment.

* * * * *